3,509,217
OXIDATION OF UNSATURATED THIOETHER
Harlan B. Freyermuth, Easton, Pa., assignor to GAF Corporation, a corporation of Delaware
No Drawing. Filed Oct. 6, 1961, Ser. No. 143,303
Int. Cl. C07c 147/02, 147/04, 147/14
U.S. Cl. 260—607                    1 Claim

ABSTRACT OF THE DISCLOSURE

Production of the reaction intermediate, 2-vinylsulfinylethanol, and the textile modifier, 2-vinylsulfonylethanol, by oxidation of 2-vinylthioethanol.

---

This invention relates to a novel chemical compound and to methods for producing same. More particularly, the invention is concerned with the novel compound 2-vinylsulfonylethanol and its production.

It is of course well known that a multitude of reactive chemical compounds have been used in many fields, including reaction and/or cross-linking with textile fibers, and homopolymerization, copolymerization, graft polymerization, in the production of polymeric materials, and other uses.

It is an object of this invention to provide a new chemical compound. Another object of this invention is the provision of a new chemical compound useful in the aforementioned and other fields. Still another object of this invention is the provision of a new chemical compound containing two reactive groups. A further object of this invention is the provision of a new chemical compound containing two different reactive groups having different degrees and/or rates of reactivity. A still further object of this invention is the provision of a new chemical compound containing two different reactive groups, one of which is reactive under aqueous alkaline conditions and the other of which is reactive under dry, hot alkaline conditions. It is also an object of this invention to provide a new process for producing such new chemical compound. Other objects and advantages will appear as the description proceeds.

The above objects are attained in accordance with the present invention by the provision of the novel compound 2-vinylsulfonylethanol having the formula

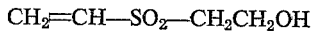

The above novel compound may be readily prepared by selective oxidation of 2-vinylthioethanol under conditions suitable for oxidizing the sulfide linkage to the corresponding sulfone. The 2-vinylthioethanol may be prepared in known manner by vinylation of 2-mercaptoethanol with acetylene as described in U.S. Patent 2,930,815.

The selective oxidation of the 2-vinylthioethanol to produce the 2-vinylsulfonylethanol may be carried out by use of oxidizing agents which have been previously suggested for oxidizing a sulfide linkage to the corresponding sulfone as for example chlorine, sodium hypochlorite, sodium chlorate in HCl, hydrogen peroxide in glacial acetic acid, etc. These processes are however not particularly efficient since there is a tendency towards simultaneous oxidation of the terminal hydroxy and/or vinyl groups and/or epoxidation of the terminal vinyl group in the 2-vinylthioethanol, 2-vinylsulfinylethanol and/or 2-vinylsulfonylethanol, and other side reactions, whereby yields of the desired compound are deleteriously affected.

As another feature of this invention, it has been found that the desired compound may be obtained in unexpectedly improved yields and with concurrent advantages in other respects by reacting one mole of 2-vinylthioethanol with about two moles of hydrogen peroxide in the presence of a catalytic amount of a member of the group consisting of the tungstic, vanadic, and molybdic acids and their alkali metal, alkaline earth metal, ammonium, and amine salts. The use of the aforementioned catalytic compounds in oxidizing the 2-vinylthioethnol to 2-vinylsulfonylethanol with hydrogen peroxide unexpectedly results in a shortened reactoin time, lower reaction temperatures, increased yields of the desired compound, decreased undesirable side reactions including decreased deterioration of the 2-vinylthioethanol and 2-vinylsulfinylethanol intermediates, decreased dependence upon conditions of pH, and/or decreased loss of hydrogen peroxide due to decomposition and the like.

The method of oxidizing sulfide-containing compounds to the corresponding sulfones with hydrogen peroxide in the presence of a catalytic amount of tungstic acids or their alkali metal, alkaline earth metal, ammonium, and amine salts is broadly disclosed and claimed in the co-pending application of Buc et al., Ser. No. 861,217, filed Dec. 22, 1959, now U.S. Patent No. 3,006,963. The method of oxidizing sulfide-containing compounds to the corresponding sulfones with hydrogen peroxide in the presence of a catalytic amount of vanadic acids or their alkali metal, alkaline earth metal, ammonium, and amine salts is broadly disclosed and claimed in the copending application of Schultz et al., Ser. No. 861,215, filed Dec. 22, 1959, now U.S. Patent No. 3,006,962. The method of oxidizing sulfide-containing compounds to the corresponding sulfones with hydrogen peroxide in the presence of a catalytic amount of molybdic acids or their alkali metal, alkaline earth metal, ammonium, and amine salts is disclosed and claimed in the co-pending application of Freyermuth et al., Ser. No. 861,209, filed Dec. 22, 1959, now U.S. Patent No. 3,005,852. It will accordingly be understood that no claim is here made to the general process for oxidizing a sulfide to a sulfone with hydrogen peroxide in the presence of a catalytic amount of a member of the above defined group of catalysts, but only to the use of such oxidation process for oxidizing 2-vinylthioethanol to 2-vinylsulfonylethanol. The operativeness of the claimed process was unexpected because, among other reasons, these catalysts are known to catalyze the epoxidation of an ethylenic group with hydrogen peroxide.

In carrying out the oxidation reaction it is preferred to employ an aqueous medium although in some instances a water miscible organic solvent for the starting intermediate may be employed alone or with water as the reaction medium. The reaction may be carried out at any temperature ranging from the freezing point to the boiling point of the medium although elevated temperatures of about 50–80° or 90° C. are preferred in most instances to accelerate the reaction. It is one of the advantages of this process that it may be carried out at lower temperatures than required in the absence of the present catalyst, and that even at the same temperatures, much shorter reaction times are made possible whereby procedural and economic advantages are obtained and undesirable side reactions including deterioration of intermediate compounds, oxidizing agent and the like is minimized.

The two moles of hydrogen peroxide theoretically required to oxidize the 2-vinylthioethanol to 2-vinylsulfonylethanol may be added at the start of the reaction or may be added gradually as the reaction proceeds. The oxidation reaction proceeds in two stages, in the first of which the sulfide is oxidized to the sulfoxide (2-vinylsulfinylethanol) and in the second of which the sulfoxide is oxidized to the sulfone. The first stage of the reaction proceeds readily and is exothermic in nature so that cooling may sometimes be required to prevent the temperature from rising to a point detrimental to the reaction or to the chemical structure of the desired product. The reaction medium may be homogeneous or heterogeneous, and in the form of a solution, dispersion or emulsion. The sulfoxide intermediate may if desired be isolated by cooling the medium or salting and/or extracting with appropriate solvents and/or separating layers. The preferable separation utilizes the process of water-stripping of the reaction mixture preferably under vacuum.

One molecule of hydrogen peroxide is theoretically required to oxidize each sulfide linkage in the starting intermediate to the corresponding sulfoxide, and another molecule of hydrogen peroxide to oxidize the sulfoxide to the sulfone. It is another advantage of this process that only substantially theoretical proportions are needed (although an excess of the hydrogen peroxide may be employed if so desired). This is made possible by the accelerated rate of reaction and/or lower reaction temperatures necessary in the present process and is selectivity. For similar reasons, with tungstic and molybdic acid compounds, the reaction medium may be maintained at any desired pH ranging for example from about 0.5 to 10 or 11, and preferably about 5 to 7, even though alkaline conditions are normally detrimental to the stability of the hydrogen peroxide. With vanadic acid compounds, the pH should range from about 0.5 to 6, preferably 1 to 3.

The oxidation of the sulfoxide intermediate to the sulfone is somewhat more difficult and should preferably be carried out at a relatively higher temperature than the first step of the oxidation. In any case, the reaction to either the sulfoxide or the sulfone stage may be followed by testing for unreacted hydrogen peroxide with starch-iodide paper as the reaction proceeds. A negative testing indicates an absence of unreacted hydrogen peroxide indicating completion of the reaction if the theoretical amount of hydrogen peroxide has been employed.

The hydrogen peroxide is preferably added in the form of the commercially available 30 to 31% aqueous solution although it may be added in any other form, e.g. from 5 to 100% concentration. To minimize loss due to decomposition of the hydrogen peroxide it is in some instances preferred to maintain the pH of the reaction medium in the neutral or acid range and/or to add the hydrogen peroxide at a rate about equal to its rate of consumption in the reaction. It will be understood that the process may be carried out by batch, intermittent or continuous methods. Any excess of hydrogen peroxide remaining after completion of the reaction may be removed by a brief reflux or by addition of a small, equivalent amount of sodium bisulfite.

The preferred catalysts for use in the present process are the tungstic acid compounds, particularly tungstic acid or sodium tungstate. Any other tungstic acid or alkali metal, alkaline earth metal, ammonium or amine salt thereof, neutral or acid may be employed. For example, the corresponding homopolytungstic and heteropolytungstic acids and their salts may be employed, as for example, those of borotungstic acid, phosphotungstic acid, bismotungstic acid, selenotungstic acid, molybdotungstic acid, and the like.

As the vanadic acid catalyst, there may be employed in the present process a vanadic, polyvanadic or peroxyvanadic acid or a salt thereof, neutral or acid. Vanadic acid or sodium or ammonium vanadate are preferred, but any other vanadic acid compound or alkali metal, alkaline earth metal, ammonium or amine salt thereof may be employed. For example, as discussed in Sidgwick, "Chemical Elements and Their Compounds," Oxford University Press, 1950, vol. I, beginning at page 811, vanadic acid is known to form a series of highly condensed to polymerized acids of increasing complexity to which may be ascribed the formula $(V_2O_5)_n$. These vanadic acids and their hydrolyzed and/or acidified derivatives, in any of their ortho, meta, or other forms of structures, are operative herein, in addition to their peroxy forms, e.g. resulting from treatment with hydrogen peroxide.

As the molybdic acid catalyst, molybdic acid or sodium or ammonium molybdate may be employed, or any other molybdic acid or alkali metal, alkaline earth metal, ammonium or amine salt thereof, neutral or acid. Homopolymolybdic and heteropolymolybdic acids may be employed, as for example, those of boromolybdic, phosphomolybdic, bismomolybdic, selenomolybdic, acid and the like.

Salts of any of these tungstic, vanadic, and molybdic acids with sodium, potassium, lithium, calcium, barium, magnesium, ammonium, mono-, di-, and tri-ethanol-, propanol-, methyl-, -ethyl-, and -propyl-amines, cyclohexylamine, morpholine, pyridine, picoline and the like may be employed. The catalyst may also be formed in the reaction medium by addition of the metal oxide. The catalytic amount of such tungstic, vanadic and molybdic acid compounds required to achieve the desired results will in any particular instance be readily ascertainable by the person skilled in the art operating the process. In general, such amounts may range from about 0.001% to 10% by weight of the compound being oxidized, although amounts outside this range may be operative. Generally, 0.1 to 1% of the catalyst will be sufficient.

In carrying out the above described oxidation process, it has been discovered that in some instances small and even trace amounts of copper, chromium, iron and certain other metals catalyze the decomposition of hydrogen peroxide and/or other side reactions detrimental to the progress of the desired reaction. As a further feature of this invention, these side reactions may be minimized or eliminated by inclusion in the reaction medium of a small amount of a sequestering agent, for example, from about 0.001 to 5% in the medium. Ethylenediamine tetraacetic acid and other aminopolycarboxylic and polyaminopolycarboxylic acids and their salts, preferably the alkali metal (sodium, potassium) salts, are preferred but other known sequestering agents for such metals may be used such as $\beta$-hydroxyethylethylenediamine triacetic acid, triethanolamine, citric acid, tartaric acid, salicyclic acid, bis-N($\beta$-hydroxyethyl) glycine, gluconic acid, and the like.

The 2-vinylsulfonylethanol of the present invention is a water soluble oil at room temperature and is highly effective as a cross-linking agent for reaction with cellulose and other fibers for the production of permanent dimensional and shape retention properties including resistance to shrinking and creasing. For example, the compound may be applied to a cotton fabric from an aqueous alkaline bath and the treated fabric subsequently dried and cured to produce a cross-linked fabric having improved dimensional and shape retention properties. By reason of its two different reactive groups, a number of additional advantages are possible. Thus, only the vinyl group in the compound reacts with the hydroxyl group of the cellulose fiber in the aqueous alkaline treating bath. The reacted fiber or fabric may then be washed, dried, dyed, and/or subjected to any other desired intermediate chemical or mechanical operations whereafter the fiber or fabric can be fixed and dimensionally stabilized in any desired shape by curing in the presence of an alkaline substance. During this subsequent curing step, the fibers are cross-linked by reaction between the terminal ethanol group of the present compound previously linked to a cellulose molecule, and a hydroxy group of an adjacent cellulose molecule.

The following example is only illustrative of the present invention and is not to be regarded as limitative. All parts and proportions referred to herein and in the appended claims are by weight unless otherwise indicated.

EXAMPLE

A 50% solution of sodium hydroxide was added dropwise to a mixture of 0.33 g. tungstic acid $(WO_3 \cdot H_2O)$ and 38 mil. water with stirring until the pH reached 12.0. After 10 minutes stirring and all the tungstic acid was dissolved the pH was lowered to 6.0 by a dropwise addition of acetic acid. The sodium tungstate solution and 52.0 g. 2-vinylthioethanol (0.5 mole) were placed in a 300 ml. 3-necked flask equipped with a stirrer, thermometer and dropping funnel. 98 ml. of 31% hydrogen peroxide (34 g. of 100% $H_2O_2$) was placed in the dropping funnel. The mixture in the flask was heated to 60–65° C. and the addition of hydrogen peroxide was started. The first half of the hydrogen peroxide was added at 60–65° C. and the temperature was increased to 65–70° C. for the addition of the second half. The oxidation is exothermic. After three hours (temperature 65–70° C.), the reaction mixture gave a negative test for hydrogen peroxide on starch-iodide test paper and also to titanyl sulfate solution. The solution contained 34% of 2-vinylsulfonylethanol. The product was isolated from the reaction mixture by distillation of the water under vacuum.

This invention has been disclosed with respect to certain preferred embodiments and various modifications and variations thereof will become obvious to the person skilled in the art. It is to be understood that such modifications and variations are to be included within the spirit and scope of this invention.

I claim:
1. 2-vinylsulfinylethanol.

References Cited

UNITED STATES PATENTS

| 2,103,879 | 12/1937 | Ufer | 260—607 |
| 2,812,267 | 11/1957 | Garner et al. | 260—488 |
| 3,005,852 | 10/1961 | Freyermuth | 260—607 |
| 3,006,962 | 10/1961 | Schultz et al. | 260—607 |
| 3,006,963 | 10/1961 | Buc et al. | 260—607 |

FOREIGN PATENTS

| 635,396 | 9/1936 | Germany. |

GEORGE F. LESMES, Primary Examiner

J. CANNON, Assistant Examiner

U.S. Cl. X.R.

260—79.3